(12) United States Patent
Tanaka et al.

(10) Patent No.: US 6,440,484 B1
(45) Date of Patent: Aug. 27, 2002

(54) LOW-TEMPERATURE AND HIGH-PRESSURE PROCESSING METHOD FOR FISH MEAT AND/OR KNEADED FISH MEAT PRODUCTS

(75) Inventors: Shu Tanaka; Izumi Chiiro; Hiroshi Oshima, all of Yubari (JP)

(73) Assignee: Hokurei Co., Ltd., Hokkaido (JP)

( * ) Notice: Subject to any disclaimer, the term of this patent is extended or adjusted under 35 U.S.C. 154(b) by 0 days.

(21) Appl. No.: 09/673,224

(22) PCT Filed: Feb. 21, 2000

(86) PCT No.: PCT/JP00/00970

§ 371 (c)(1),
(2), (4) Date: Nov. 24, 2000

(87) PCT Pub. No.: WO00/49898

PCT Pub. Date: Aug. 31, 2000

(30) Foreign Application Priority Data

Feb. 22, 1999 (JP) ............................................ 11-043333

(51) Int. Cl.[7] ................................................ A23L 1/325
(52) U.S. Cl. ..................... 426/643; 426/645; 426/646; 426/524; 426/385
(58) Field of Search .................. 426/643, 524, 426/645, 646, 393, 414, 404

(56) References Cited

U.S. PATENT DOCUMENTS 4,474,823 A  * 10/1984  Nishikawa .................. 426/643
6,007,864 A  * 12/1999  Goodband .................. 426/643
6,033,701 A  *  3/2000  Hirsch ........................ 426/268

FOREIGN PATENT DOCUMENTS

| JP | 63-74446 | * | 4/1988 |
| JP | 2-177852 | | 7/1990 |
| JP | 402177875 | * | 7/1990 |
| JP | 2-211857 | * | 8/1990 |
| JP | 3-143374 | * | 6/1991 |
| JP | 4-148667 | * | 5/1992 |
| JP | 5-137550 | * | 6/1993 |
| JP | 5-344875 | * | 12/1993 |
| JP | 9-266755 | * | 10/1997 |
| JP | 11-28078 | * | 2/1999 |
| JP | 11-253136 | * | 2/1999 |

* cited by examiner

Primary Examiner—Carolyn Paden
(74) Attorney, Agent, or Firm—Hollander Law Firm, P.L.C.

(57) ABSTRACT

A high-pressure processing method which can produce fish meat and/or a kneaded fish meat products having improved sterilizability, texture and taste by a treatment at a relatively low pressure range is provided. A low-temperature and high-pressure processing method for fish meat and/or kneaded fish meat products which performs high-pressure treatment at low temperature of a frozen preparation of fish meat and/or a kneaded fish meat product obtained by freezing fish meat and/or a kneaded fish meat product after dehydration treatment or without dehydration treatment thereof while maintaining it in a frozen state is provided. Since fish meat and/or kneaded fish meat products which is sufficiently sterilized, has good storability, and has favorable texture can be obtained by the above method even when subjected to high-pressure treatment at a relatively low pressure range, the method is useful in the field of fish meat and/or kneaded fish meat products.

32 Claims, No Drawings

LOW-TEMPERATURE AND HIGH-PRESSURE PROCESSING METHOD FOR FISH MEAT AND/OR KNEADED FISH MEAT PRODUCTS

TECHNICAL FIELD

The present invention relates to a low-temperature and high-pressure processing method for fish meat and/or kneaded fish meat products. More particularly, the present invention relates to a low-temperature and high-pressure fish meat processing method which performs high-pressure processing of a frozen preparation of fish meat and/or a kneaded fish meat product at low temperature, while maintaining its frozen state. By the present invention, novel foods having texture something like, for example, raw ham or vinegar-pickled mackerel and containing less bacteria can be obtained from fish meat and/or a kneaded fish meat product as a raw material.

BACKGROUND ART

So-called "super high-pressure fish meat processing methods" which process fish meat by applying it with a high-pressure of 3,000 to 10,000 kg/cm$^2$ (i.e., 3,000 atm to 10,000 atm) are means which can not only sterilize fish meat without applying heat to it, but also obtain new fish meat products by utilizing denaturation of fish meat protein at high-pressures so that recently they have been paid much attention and many studies have been made thereon. The conventional high-pressure fish meat processing methods apply a high-pressure of usually 3,000 to 5,000 kg/cm$^2$, sometimes approximately 10,000 kg/cm$^2$ so that the high-pressure processing apparatus needs reinforcement of its pressure resistant walls of the high-pressure processing chamber and for this purpose a large, expensive apparatus has to be used. However, the volume of the high-pressure processing chamber is small as compared with the large size of the apparatus so that productivity is low. Naturally, the conventional high-pressure fish meat processing methods are costly. Therefore, to decrease the cost of high-pressure fish meat processing methods, it is necessary to process at a pressure lower than the conventional one so that the thickness of the pressure resistant walls of the high-pressure processing chamber in a high-pressure processing apparatus can be reduced.

DISCLOSURE OF THE INVENTION

Under the circumstances, the present inventors made investigation on a method for processing fish meat at a high-pressure but lower than the conventional one with view to decreasing manufacturing costs to be incurred in high-pressure fish meat processing methods and found that use of fish meat in an cold stored (frozen) state enables efficient sterilization at a relatively low high-pressure and completed an invention, of which a patent application was filed under the title of "A low-temperature and high-pressure processing method for a kneaded fish meat product" (see Patent Application No. Hei 10-76512, JP-A-Hei 11-253136).

That is, according to the above invention of Patent Application No. Hei 10-76512 by the present inventors, it was clarified that use of a kneaded fish meat product in a frozen state enables one to obtain sufficient sterilizing effects at a relatively low high-pressure range of 1,500 to 2,500 kg/cm$^2$. Also, it was confirmed that use of kneaded fish meat product in a frozen state enables one to make the thickness of the pressure resistant walls of the high-pressure processing chamber in a high-pressure processing apparatus thinner than that of the conventional apparatus, thus decreasing manufacturing costs of the high-pressure processing apparatus.

The above method is to process a frozen product of a kneaded fish meat product at low temperature while maintaining its frozen state. In the present invention, investigation has been made with view to further improving the above invention and providing a method which can further improve the sterilizability and taste of the obtained high-pressure processed product and as a result the present invention has been completed. That is, the present inventors have found that the low-temperature and high-pressure processing method that performs high-pressure processing at low temperature while maintaining the frozen state can be applied not only to kneaded fish meat product but also to fish meat such as fillet, block, etc. and that application of the above method to a frozen fish meat and/or a frozen kneaded fish meat product obtained by dehydrating and freezing fish meat and/or a kneaded fish meat product can provide fish meat and/or a kneaded fish meat product which have increased sterilizability, give no fishy smell and have desirable texture that has not been obtained conventionally, thus completing the present invention.

The present invention provides methods for solving the above problems and relates to:

1. A low-temperature and high-pressure processing method for fish meat and/or kneaded fish meat products, comprising high-pressure processing, at low temperature, frozen a fish meat and/or a frozen kneaded fish meat product obtained by dehydrating and freezing fish meat and/or a kneaded fish meat product while maintaining the frozen state thereof.

2. The low-temperature and high-pressure processing method for fish meat and/or kneaded fish meat products as described in 1 above, wherein the fish meat and/or the kneaded fish meat product is dehydrated until the water content thereof becomes in the range of 50 to 65%.

3. A low-temperature and high-pressure processing method for fish meat, comprising high-pressure processing, at low temperature, a frozen fish meat obtained by freezing fish meat while maintaining the frozen state thereof.

4. The low-temperature and high-pressure processing method for fish meat and/or kneaded fish meat products as described in any one of 1 to 3 above, wherein the frozen fish meat and/or the frozen kneaded fish meat product is sliced, one slice or several slices together are wrapped under vacuum and frozen again, the frozen fish meat and/or, the frozen kneaded fish meat product is high-pressure processed at low temperature while maintaining the frozen state thereof.

5. The low-temperature and high-pressure processing method for fish meat and/or kneaded fish meat products as described in any one of 1 to 4 above, wherein the high-pressure processing is performed at a pressure in the range of 1,500 to 2,500 kg/cm$^2$.

6. The low-temperature and high-pressure processing method for fish meat and/or kneaded fish meat products as described in any one of 1 to 5 above, wherein the high-pressure processing is performed at a temperature in the range of −1° C. to −24° C.

7. The low-temperature and high-pressure processing method for fish meat and/or kneaded fish meat products as described in any one of 1 to 6 above, wherein the frozen fish meat and/or the frozen kneaded fish meat product wrapped under vacuum is charged in a high-pressure processing chamber of a low-temperature and high-pressure processing apparatus, an anti-freezing fluid as a pressure elevating medium cooled to a temperature in the range of −1° C. to −24° C. is filled in the high-pressure processing chamber, and a high-pressure of 1,500 to 2,500 kg/cm$^2$ is applied thereto for a predetermined time.

8. The low-temperature and high-pressure processing method for fish meat and/or kneaded fish meat products as described in any one of 1 to 7 above, wherein the fish meat and/or the kneaded fish meat product of a fish such as salmon, mackerel, herring, pacific saury, or sardine is used.

9. Fish meat and/or a kneaded fish meat product obtained by the low-temperature and high-pressure processing method for fish meat and/or kneaded fish meat products as described in any one of 1 to 8 above.

Hereinafter, the present invention will be described in detail. In the whole description of the present invention, the expression of "%" means "% by weight" unless otherwise indicated specifically.

Raw material fishes and shellfish used in the present invention are not particularly limited and daily-used well-known sea food materials, for example, fishes such as walleye pollock, cod, flounder, Atka mackerel, salmon, horse mackerel, mackerel, herring, pacific saury, and sardine, shellfishes such as scallop and Sakhalin surf clam, crustaceans such as shrimp and crab, mollusks such as squid and octopus and the like can be used. By use of fish after meat packing of particularly the salmon family such as white salmon (simply called "salmon" and also referred to as "akiaji"), red trout, pink salmon, sockeye salmon, coho salmon, king salmon, and trout salmon, products having unique taste and texture can be obtained. In addition, fishes of the salmon family can be constantly obtained as a raw material so that they are suitable as objects to which the low-temperature and high-pressure processing method of the present invention is applied. When a kneaded fish meat product is used as a raw material, it is of course possible to use a plurality of fishes with mixing, such as a mixture of 70% of pink salmon and 30% of sockeye salmon. Furthermore, use of fish meat of so-called "lusters" such as horse mackerel, mackerel, herring, pacific saury, and sardine can provide unique preferable products from which specific fishy smell has disappeared and which has no fishy smell and has texture resembling vinegar-pickled mackerel without using vinegar, etc. The fish meat of "lusters" can be used as it is as a material for sushi or marinade.

The raw material fishes and shellfishes which are used need be as fresh as possible and when dehydration treatment is performed, they need be frozen as quickly as possible after the dehydration to obtain frozen products, to which high-pressure is applied at low temperature while maintaining them in a frozen state.

In the present invention, the term "fish meat" means an edible portion of sea food material in general and refers to stripped shellfish, unhusked crustacean meat, molluskan meat, fillet or block-like meat cut from fish after meat packing, slices thereof, cut-off and split portions thereof. The term "kneaded fish meat product" broadly includes crushed products and kneaded products of fish meat, and those prepared into mince meat or paste meat, and appropriate mixtures thereof. In the present invention, it is possible to use as raw material fish meat and/or kneaded fish meat products non-uniform kneaded products which contain ground meat or paste meat of fish in which block-like fish meat pieces such as split meat or block meat are mixed. It is preferred that the raw material fish meat and/or a kneaded fish meat product contain as less as possible skin or bone.

In the present invention, when the raw material, fish meat and/or a kneaded fish meat product (hereinafter, sometimes referred to as fish meat, etc.) is subjected to dehydration treatment, any dehydration method may be used. For example, known methods such as a vacuum decompression drying method, a pressure drying method and a salting dehydration method can be used. From the viewpoints that treatment can be completed in a short time and that no influence is given to the quality of meat, a dehydration method using a sheet for dehydration is preferable. As the sheet for dehydration, "Pichitto Sheet" (trade name for a sheet for dehydration by Showa Denko Co., Ltd.) , etc. are known. Use of them is preferable since dehydration can be readily and achieved to an appropriate water content in a simple manner. When the raw material fish meat and/or a kneaded fish meat product is dehydrated using a sheet for dehydration, it is preferred that the fish meat and/or a kneaded fish meat product wrapped in or mounted on the sheet for dehydration be maintained at a temperature in the range of about 0 to 5° C. Usually, the water content of fishes and shellfishes is about 70 to 80%. In contrast, in the present invention, the dehydration is continued until the water content in the range of 50 to 65%, preferably 55 to 60%, is reached. For the measurement of water contents of fish meat and/or a kneaded fish meat product before and after the dehydration treatment, an infrared moisture meter (for example, infrared moisture meter Model FD-100, manufactured by Ket Science Institute Co., Ltd.), etc. can be used.

In the case of fat-rich raw materials containing about 6 to 13% of fat, such as mackerel, sardine, herring, and pacific saury, a relatively small amount of moisture is present so that desired products can be obtained without performing dehydration treatment of the raw material fish meat and/or a kneaded fish meat product.

The raw material fish meat and/or a kneaded fish meat product may be adjusted or molded into appropriate size and shape after optionally adding salt, seasonings, spices, binders, etc., if necessary and wrapped with an appropriate wrapping material such as fibrous casing (reproduced cellulose+Japanese paper: manufactured by Fujimori Industries Co, Ltd.) or the like, and frozen, preferably by a quick freezing method. When the raw material fish meat and/or a kneaded fish meat product is subjected to dehydration treatment, the above treatments may be performed after the dehydration treatment.

In the present invention, the thus-obtained frozen preparation of fish meat and/or a kneaded fish meat product may be wrapped in an appropriate wrapping material and placed in this state in the high-pressure chamber of a low-temperature and high-pressure processing apparatus for application of high-pressure thereon. However, it is preferred that the following pretreatment be performed before the high-pressure treatment is carried out.

That is, the frozen preparation of fish meat and/or a kneaded fish meat product obtained by freezing is sliced to thin pieces and the sliced fish meat and/or the sliced kneaded fish meat product (hereinafter, referred simply to fish meat pieces) are wrapped one by one with a wrapping material such as a bag or several fish meat pieces together are wrapped in a wrapping material and sealed under vacuum (so-called vacuum wrapped) in accordance with the usual method. The thickness of a slice is preferably about 2 to 10 mm. When several fish meat pieces together are vacuum wrapped, it is recommendable to insert an appropriate film such as thin polyethylene film (PE) or oriented polypropylene (OPP) film between the fish meat pieces so that the fish meat pieces should not be bound to each other. As the wrapping material for use in wrapping fish meat pieces, preferably known materials made of plastic synthetic resins suitable for high pressure processing, for example, polyvinylidene chloride, polystyrene, non-oriented polypropylene, nylon, polyester, nylon/polyethylene, nylon/ethylene-vinyl acetate copolymer saponification product/polyethylene, polypropylene/ethylene-vinyl acetate copolymer saponification product/polyethylene, polypropylene/polyethylene, etc. can be used. Upon vacuum wrapping, preferably the fish meat pieces are uniformly contained in the wrapping material and sufficiently deaerated so that the fish meat pieces can be adhered on the inner surface of the wrapping material such as a bag, and then sealed. If the pretreatment was not performed, there is the fear that the wrapping material will burst when high-pressure is applied thereto. From the viewpoints of pressure resistance and air-tightness, it is preferable to use particularly those made of nylon/polyethylene/linear low density polyethylene or polypropylene/polyethylene as the wrapping material. The vacuum wrapped fish meat pieces are frozen again preferably by use of a quick freezing method and placed in the high-pressure processing chamber of a low-temperature and high-pressure processing apparatus while maintaining the frozen state thereof and high-pressure is applied thereto at low temperature.

In the present invention, since the fish meat etc. are in a frozen state and in addition since the high-pressure is applied at low temperature, the range of high pressure applied to fish meat and/or kneaded fish meat products may be a high-pressure, but is lower than conventional one, that is, in the range of about 1,500 to 2,500 kg/cm², preferably 1,750 to 2,000 kg/cm². The time for the high-pressure processing may vary depending on the type of fish meat but usually within the range of 5 to 30 minutes, preferably about 20 minutes.

In the present invention, the high-pressure processing needs to be carried out at a low temperature while maintaining the fish meat, etc. in a frozen state. The term "at low temperature" means a low temperature to such an extent that the frozen state of the frozen product such as fish meat can be maintained at that temperature. Therefore, the processing temperature is not particularly limited but preferably the processing is performed at low temperature in the range of –1° C. to –24° C. More preferably, it is performed at low temperature of about 3° C. to –20° C. Specifically, the processing may be performed using an apparatus, for example, a "super-high-pressure freezing sterilization apparatus" (orifice of the processing chamber: 280 mm, height: 1,000 mm, processing volume: 60 l, operable at a cooling temperature of –30° C. or higher and a pressure of up to 3,000 kg/cm²) developed jointly by the present applicant and The Japan Steel Works, Ltd. In the case where the high-pressure processing is performed at low temperature, when this kind of apparatus is used, frozen fish meat and/or a kneaded fish meat product vacuum wrapped or wrapped by a wrapping material such that the fish meat, etc. can be adhered on the inside surface thereof is placed, an anti-freezing fluid cooled to an appropriate temperature between –1° C. and –24° C. is filled in the high-pressure processing chamber as a pressure elevation medium, a high-pressure generator and a cooling device attached to the apparatus are actuated to generate a high-pressure state at low temperature, and the processing is performed by applying the high-pressure for a predetermined time. As the anti-freezing fluid, propylene glycol (hereinafter, referred to as PG) or alcohol or mixtures thereof may be used advantageously.

By processing the dehydrated frozen fish meat, etc. at temperature of –1° C. to –24° C. under a high-pressure of 1,500 to 2,500 kg/cm² while maintaining the frozen state thereof, the proteins in the fish meat, etc. are denatured and gelled. *Escherichia coli*, Salmonella, Staphylococci, etc. are killed and general viable bacteria other than pressure resistant bacteria are also killed. Therefore, the fish meat and/or kneaded fish meat products of the present invention with the dehydration treatment has storage stability to such an extent as not to cause change in quality for about 3 months if maintained at a temperature in the range of +2° C. to +3° C. It is preferable that the products of the present invention without the dehydration treatment is freeze-stored.

The products obtained by the low-temperature and high-pressure processing method of the present invention have a reinforced bindability of fish meat, etc. so that the muscular proteins in the fish meat, etc. coalesce with each other appropriately to give a state where the fish meat, etc. have texture of strong elasticity and a fresh taste. In particular, when fish meat of the fishes belonging to the family of salmon, raw ham-like tasty products can be obtained. Use of fish meat of mackerel, horse mackerel, herring, pacific saury, or sardine can give rise to products having texture like vinegar-pickled mackerel.

Hereinafter, the advantageous effects of the present invention will be described in detail by way of test examples.

Test Example 1

<Comparison of High-pressure Sterilization Effect and Quality Depending on the Shape of Product>

Frozen pink salmon dress was thawed in running water and thereafter meat was collected and spread over a sheet for dehydration ("Pichitto Sheet" Model 21 M, manufactured by Showa Denko K.K.) and several such sheets were stacked one over another and left to stand in an incubator kept at 0° C. for 16.5 hours to dehydrate them. Then, table salt, etc. were added to this to prepare kneaded salmon meat having a water content of 64%. The kneaded salmon meat was filled in two fibrous casings of 75 mm in diameter ×360 mm in length and these were quickly frozen at –30° C. One of them was introduced in a polypropylene/polyethylene bag as it was and vacuum wrapped to obtain Sample B. The other one was sliced to 2 mm pieces, which were introduced into a bag made of the same material as above to obtain Sample A. The frozen Samples A and B together were placed in the "super-high-pressure freezing sterilization apparatus" (orifice of the processing chamber: 280 mm, height: 1,000 mm, processing volume: 60 l, operable at a cooling temperature of –30° C. or higher and a pressure of up to 3,000 kg/cm²) developed jointly by the present applicant and The Japan Steel Works, Ltd. and a high-pressure of 2,000 kg/cm² was applied for 20 minutes using PG at –3° C. as a pressure elevation medium.

The high-pressure processed Samples A and B were measured of general viable cell number and colon bacteria cell number according to the provision of Food Sanitation Law, further organoleptic tests were carried out by a panel of 10 expert panelists on each item of color tone, texture, degree of binding, and commercializability by five points method (1 point: bad to 5 points: excellent), and further water activity value at 25° C. and water content were measured. The results shown in Table 1 were obtained.

TABLE 1

| Test Item | Sample A (Slice) | Sample B (Block) |
|---|---|---|
| 1 Color tone | 3 | 3 |
| 2 Texture | 5 | 3 |
| 3 Degree of binding | 5 | 3 |
| 4 Commercializability | 5 | 3 |
| 5 Water activity value (25.0 °C.) | 0.936 | 0.942 |
| 6 Water content | 64.8 | 66.7 |
| 7 General viable cell number | $0.5 \times 10^1$ | $3.0 \times 10^1$ |
| 8 Colon bacteria cell number | 0 | 0 |

As can be seen from Table 1, when a high-pressure of about 2,000 kg/cm$^2$ was applied, it was observed that both Samples A and B subjected to the dehydration treatment presented sufficient sterilization effects.

Also, it was confirmed that Sample A processed in the form of a slice and Sample B processed in the form of a block were satisfactory concerning the color tone and texture, while Sample A processed in the form of a slice was superior to Sample B in the form of a block in all the items except for the color tone.

Test Example 2
<Comparison of High-pressure Sterilization Effect and Quality Depending on the Presence or Absence of Freezing>

To each of the frozen samples in the form of a slice prepared in the same manner as in Sample A in Test Example 1 (water content: 64%) maintained in a frozen state (Sample C) or stored in a chilled state (+3° C.) (Sample D) was applied a high-pressure of 2,000 kg/cm$^2$ for 20 minutes using the low temperature high-pressure apparatus used in Test Example 1. The high-pressure processed Samples C and D were tested in the same manner as in Test Example 1 and the results shown in Table 2 were obtained. Table 2 shows mean values of 6 pieces for each sample.

TABLE 2

| Temperature of pressure medium Test Item | −3° C. Sample C (Frozen) | −3° C. Sample D (Chilled) |
|---|---|---|
| 1 Water activity value (25.0° C.) | 0.936 | 0.952 |
| 2 General viable cell number | $2.8 \times 10^1$ | $4.2 \times 10^2$ |
| 3 Colon bacteria cell number | 0 | $5.0 \times 10^1$ |
| 4 Color tone | 3 | 5 |
| 5 Texture | 5 | 2 |
| 6 Degree of binding | 5 | 2 |
| 7 Commercializability | 5 | 2 |

As can be seen from the results shown in Table 2, sample in which the fish meat, etc. were maintained in a frozen state upon the high-pressure processing (Sample C) had a water activity value apparently lower than that of the sample in which the fish meat, etc. were maintained in a chilled state upon the high-pressure processing (Sample D) and a sterilization effect in terms of general viable cell number showed a difference of one digit in average. In particular, in the case of colon bacteria, although they were detected in the chilled sample (Sample D), they were killed in the frozen sample (Sample C). As to the color tone, Sample D looked more fresh and won higher evaluation and in accordance therewith Sample D was softer in the quality of meat in terms of texture and degree of binding possibly due to insufficient denaturation of proteins so that it showed a low commercial value.

Test Example 3
<Comparison of Sterilization Effect Depending on the Kind of Fish>

Horse mackerel, herring, pacific saury, and mackerel were tested on sterilization effects by high-pressure processing. Over fillets of horse mackerel, herring, pacific saury, and mackerel, respectively, was sprinkled 3% of a seasoning powder consisting of 50.0% trehalose, 45.0% of table salt, 5.0% of pepper and the fillets were stored in a low temperature chamber for 20 hours and vacuum wrapped without dehydration treatment. To the frozen fish meat samples obtained by freezing after the vacuum wrapping was applied a high-pressure of 2,000 kg/cm$^2$ for 20 minutes using the low temperature high-pressure apparatus used in Test Example 1 while maintaining the frozen state thereof. The bacteriological test results are shown in Table 3.

[Table 3]

TABLE 3

| | Before high-pressure processing | | After high-pressure processing | |
|---|---|---|---|---|
| | General Viable cell number | Colon bacteria viable cell | General Viable cell number | Colon bacteria viable cell |
| Pacific saury | $3.5 \times 10^3$ | 0 | $2.7 \times 10^2$ | 0 |
| Herring | $6.5 \times 10^3$ | $6.0 \times 10$ | $3.5 \times 10^2$ | 0 |
| Horse mackerel | $2.4 \times 10^3$ | $2.0 \times 10$ | $1.3 \times 10^2$ | 0 |
| Mackerel | $2.9 \times 10^3$ | 0 | $1.5 \times 10^2$ | 0 |

From these results, it can be seen that in fishmeat containing much fat such as pacific saury, herring, horse mackerel, and mackerel, both general viable cells and colon bacteria viable cells could be decreased considerably to effect effective sterilization by performing low-temperature and high-pressure processing without dehydration treatment while maintaining the frozen state thereof.

Test Example 4
<Comparison of Storage Stability of Low Temperature High-pressure Processed Kneaded Fish Meat Product Depending on the Presence or Absence of Dehydration>

Frozen trout dress was thawed in running water and meat was collected. This was spread on the same sheet for dehydration as used in Test Example 1 and several such sheets were stacked one on another and left to stand in an incubator kept at 0° C. for 14 to 18 hours to effect dehydration treatment and then table salt was mixed therewith to prepare kneaded salmon meats E, F, and G having water contents of 58%, 60%, and 65%, respectively. Also kneaded salmon meat H not subjected to dehydration treatment (water content: 75%) was provided. The kneaded salmon meats were filled in the same casing as used in Test Example 1 and sliced to a thickness of 2 mm after quickly freezing it. Three each of the sliced pieces were put in a bag made of polypropylene/polyethylene and deaerated and vacuum wrapped in a state where the sample fish meat pieces were sufficiently adhered on the inside of the bag. The four kinds of vacuum wrapped fish meat pieces E, F, G, and H were quickly frozen at −30° C. to prepare Samples E, F, G, and H, respectively.

To each sample was applied a high-pressure of 2,000 kg/cm$^2$ for 20 minutes using the low temperature high-pressure apparatus used in Test Example 1 and PG at −3° C. as a pressure elevation medium.

Each of the obtained samples was placed in an incubator kept at +2° C. to effect storage test and changes with time thereof were examined to obtain the results shown in Table 5.

TABLE 5

|  | Sample E | Sample F | Sample G | Sample H |
|---|---|---|---|---|
| Water content | 58% | 60% | 65% | 75% (no dehydration) |
| Water activity value (25.0° C.) | 0.881 | 0.883 | 0.926 | 0.976 |
| Number of storage days |  |  |  |  |
| 0 | <10 | <10 | <10 | <10 |
| 5 | <10 | <10 | <$10^2$ | <$10^3$ |
| 10 | <$10^2$ | <$10^2$ | $2.0 \times 10^3$ | <$10^6$ |
| 30 | $5.0 \times 10^2$ | $8.0 \times 10^3$ | $1.0 \times 10^4$ | <$10^7$ |
| 60 | $3.0 \times 10^3$ | $1.0 \times 10^4$ | $2.0 \times 10^5$ | — |
| 90 | $8.0 \times 10^3$ | $1.0 \times 10^5$ | — | — |

As can be seen from Table 5, the high-pressure processed product of frozen kneaded fish meat product subjected to dehydration treatment (Samples E, F and G) revealed to be apparently long lasting as compared with the high-pressure processed product of frozen kneaded fish meat product not subjected to dehydration treatment. And it revealed that the high-pressure processed product of frozen kneaded fish meat product subjected to dehydration treatment (Samples E, F and G) could be stored for a long time in a chilled state.

In the case of the high-pressure processed product of frozen kneaded fish meat product not subjected to dehydration treatment, long term storage was possible by storing in a frozen state.

Test Example 5
<Comparison of Quality of Low Temperature High-pressure Processed Kneaded Fish Meat Product Depending on the Presence or Absence of Dehydration>

In the same manner as the frozen kneaded fish meat product samples E, F, G and H in Test Example 4 were prepared frozen kneaded fish meat product samples E', G', and H' having different water contents. On each of the samples was performed organoleptic tests in the same manner as in Test Example 1 and the results shown in Table 6 were obtained.

TABLE 6

|  | Sample E' | Sample F' | Sample G' | Sample H' |
|---|---|---|---|---|
| Water content | 58% | 60% | 65% | 75% (no dehydration) |
| Water activity value (25.0° C.) | 0.881 | 0.883 | 0.926 | 0.976 |
| 1 Color tone | 4 | 4 | 3 | 3 |
| 2 Texture | 4 | 5 | 5 | 3 |
| 3 Degree of binding | 5 | 5 | 4 | 3 |
| 4 Commerciality | 4 | 5 | 5 | 2 |

From the results shown in Table 6, it was confirmed that if the low temperature high-pressure processed products were obtained from the same frozen kneaded fish meat product, the kneaded fish meat product previously subjected to dehydration treatment was superior in all the test items.

In the case of the low temperature high-pressure processed products of frozen fish meat but not kneaded fish meat product, products excellent in both the color tone and texture could be obtained without dehydration treatment.

BEST MODE FOR CARRYING OUT THE INVENTION

Hereinafter, the present invention will be described in detail by way of examples.

EXAMPLE 1

Frozen pink salmon dress was thawed in running water, filleted, and skin and bone were removed. The resulting meat was charged in a peeler to obtain fish meat in a size of about 3 mm. The water content of the fish meat was measured to be 78% in average. The fish meat was spread over the same sheet for dehydration as used in Test Example 1 to a thickness of about 15 mm. Several such sheets were stacked and left to stand in an incubator at 0° C. for 16 hours to perform dehydration treatment. The fish meat after the dehydration treatment had a water content of 65.1% in average and a water activity value of 0.920 (25.0° C.).

To the fish meat subjected to the dehydration treatment were added 4% of table salt, 0.3% of smoke flavor, 0.17% of pepper, and 5.0% of trehalose and the mixture was kneaded sufficiently and seasoned.

The seasoned kneaded fish meat product was filled in a fibrous casing of 75 mm in diameter using a stuffer and then placed in a refrigerator at −30° C. to quickly freeze it.

The frozen cased fish meat was taken out of the freezer and while it was frozen it was sliced to thin fish meat pieces of a thickness of about 2 mm.

Five each of the sliced fish meat pieces were filled in a polypropylene/polyethylene bag having an outer size of 125×235 mm in a state such that they overlap each other in a portion and immediately thereafter they were vacuum wrapped to adhere each fish meat piece on the inside of the bag. To both surfaces of one fish meat piece was applied a thin film of oriented polypropylene which conformed to the size of the fish meat piece so that the fish meat pieces could not bind to each other.

The vacuum wrapped bag containing fish meat pieces was placed in a freezer at −30° C. and again quickly frozen. The frozen bag containing fish meat was placed, while maintaining its frozen state, in the high-pressure processing chamber of a "super-high-pressure freezing sterilization apparatus" developed jointly by the present applicant and The Japan Steel Works, Ltd., PG at −3° C. was filled as a pressure elevation medium, and a high-pressure of 2,000 kg/cm$^2$ was applied for 20 minutes.

The product thus obtained had a fresh taste like raw ham without fishy smell and the tissue of the fish meat was bound like raw ham. Thus, food which resembled raw ham slice was obtained.

When the product was stored in an incubator at +2° C. for 3 months, nothing peculiar was found in the quality.

EXAMPLE 2

Fish meats of pink salmon and sockeye salmon of about 3 mm in size, obtained similarly to example 1, were mixed in a proportion of 70% of pink salmon and 30% of sockeye salmon and subjected to dehydration treatment by using the same sheet for dehydration as used in Test Example 1 and leaving to stand in an incubator at 0° C. for 18.5 hours. After the dehydration, the fish meat had a water content of 64.8% in average and a water activity value of 0.915 (25.0° C.).

To the fish meat subjected to the dehydration treatment were added 4% of table salt, 0.3% of smoke flavor, 0.17% of pepper, and 5.0% of trehalose and the mixture was kneaded sufficiently and seasoned. Then, the fish meat was processed in the same manner as in Example 1 to obtain a product.

The product thus obtained like Example 1 had a fresh taste like raw ham without fishy smell and the tissue of the fish meat was bound like raw ham. Due to sharp red color specific to sockeye salmon, food which had beautiful appearance and which resembled raw ham slice was obtained.

When the product was stored in an incubator at +2° C. for 3 months, nothing peculiar was found in the quality.

EXAMPLE 3

Frozen scallop pole was sufficiently ground in a food cutter after it was thawed. This was subjected to dehydration treatment in the same manner as in Example 1 to a water content of 60%. To the dehydrated scallop paste were added 12% of warazuka paste, 2% of pearl meat (binder: manufactured by Chiba Flower Making Co., Ltd.), and 2% of table salt and well mixed. The kneaded product was filled in a casing of 75 mm in diameter using a stuffer and then placed in a freezer at −30° C. to quickly freeze it, followed by slicing it to a thickness of about 2 mm. Five each of the slices were filled in a polypropylene/polyethylene bag having an outer size of 125×235 mm in a state such that they overlap each other in a portion and immediately thereafter they were vacuum wrapped. To both surfaces of one fish meat piece was applied a thin film of oriented polypropylene which conformed to the size of the fish meat piece so that the fish meat pieces could not bind to each other in side the bag. The vacuum wrapped bag containing fish meat pieces was placed in a freezer at −30° C. and again quickly frozen. To the frozen bag containing sliced pieces while they were maintained in a frozen state was applied a high-pressure of 2,000 kg/cm$^2$ for 20 minutes using the same low-temperature and high-pressure processing apparatus as used in Example 1 and using PG at −3° C. as a pressure elevation medium. Thus, a quite new scallop product resembling raw ham for eating without cooking was obtained.

EXAMPLE 4

After cod was dressed and meat was collected, the meat was exposed to water, lightly dehydrated, and ground. This was subjected to dehydration treatment to a water content of 65% in the same manner as in Example 1. To the dehydrated ground fish meat were added 2% of table salt, 10% of frozen egg white, and 1% of gelatin and well kneaded. The kneaded product was quickly frozen in the same manner as in Example 3 and sliced to a thickness of about 2 mm. One each of the slices was placed in a bag of the same material as used in Example 3 and having an outer size of 125×130 mm and vacuum wrapped. The vacuum wrapped product was high-pressure processed under the same conditions as in Example 3 using the same low-temperature and high-pressure processing apparatus as used in Example 1. Thus, a quite new fish meat product which was pure white, had a suitable resilience, and could be a cooking material having low fat and high protein contents was obtained.

EXAMPLE 5

Production Method for Sushi Material Resembling Vinegar-pickled Mackerel

Fresh or frozen mackerel was filleted and small bones, etc. were removed. Then, to the fish meat was sprinkled 2% of a 1:1 mixture of table salt and trehalose. The fish meat was stored in a low temperature chamber overnight, vacuum wrapped and quickly frozen. The product was kept at a temperature of −20° C. and placed in a super-high-pressure apparatus. After applying a pressure of 2,000 kg/cm$^2$ for 20 minutes to it using a pressure medium previously cooled at −8° C., the product was taken out from the apparatus and the pressure medium attached to the surface was washed off. The product was wrapped for making a marketable product and stored in a frozen state.

The low temperature high-pressure processed mackerel had texture resembling vinegar-pickled mackerel and had no fishy smell. The low temperature high-pressure processed mackerel was not subjected to dehydration treatment but general viable cell number decreased from $2.9×10^3$ before the high-pressure treatment to $1.5×10^2$ and the colon bacterial group were killed.

EXAMPLE 6
Production Method of Herring for Marinade

Fresh or frozen herring having a suitable amount of fat was filleted and small bones, etc. were removed. The fillets were vacuum wrapped and frozen. The product was maintained at a temperature of −18° C., placed in a super-high-pressure apparatus. After applying a pressure of 1,850 kg/cm$^2$ for 30 minutes to it using a pressure medium previously cooled at −8° C., the product was taken out from the apparatus and the pressure medium attached to the surface was washed off.

The obtained herring had texture similar to that of salted herring and was suitable as a material for marinade.

EXAMPLE 7
Production Method of Pacific Saury for Sliced Raw Fish (Sashimi)

Fresh or frozen large pacific saury produced in Hokkaido was filleted. Small bones and skin were removed and the fillets were washed with water, then vacuum wrapped and quickly fronzen. The product was maintained at a temperature of −18° C., placed in a super-high-pressure apparatus. After applying a pressure of 2,000 kg/cm$^2$ for 20 minutes to it using a pressure medium previously cooled at −5° C., the product was taken out from the apparatus and the pressure medium attached to the surface was washed off.

The low temperature high-pressure processed saury had a favorable texture, had no specific fishy smell, and showed a viable cell number as low as 2.0×10. Therefore, it was evaluated as being suitable for sliced raw fish (sashimi).

EXAMPLE 8
Production Method of Sardine for Salad Material

Fresh or frozen sardine harvested in autumn was filleted and after small bones were removed, the fillets were washed with water and water was drained off. Then, 2% of a 1:1 mixture of table salt and trehalose was sprinkled over the fish meat and the fish meat was stored in the dark and cold place over night. Then the fish meat was vacuum wrapped and quickly frozen. The product was kept at a temperature of −20° C. and placed in a super-high-pressure apparatus. After applying a pressure of 1,750 kg/cm$^2$ for 15 minutes to it using a pressure medium previously cooled at −7° C., the product was taken out from the apparatus and the pressure medium attached to the surface was washed off. The product was wrapped for making a marketable product and stored in a frozen state.

The low temperature high-pressure processed sardine had a suitable texture, had lost specific fishy smell, and was suitable as a material for seafood salad.

INDUSTRIAL APPLICABILITY

As described in detail above, according to the low-temperature and high-pressure processing method of the present invention, high-pressure processing of the frozen product, obtained by freezing fish meat and/or a kneaded fish meat product which has already been subjected to dehydration processing, is performed at low temperature while maintaining its frozen state. As a result, sufficient sterilization can be achieved by applying a relatively low high-pressure of 1,500 to 2,500 kg/cm$^2$ and furthermore favorable texture can be obtained. Therefore, the thickness of the pressure resistant wall of the processing chamber of a high-pressure processing apparatus can be decreased and the manufacturing costs of the high-pressure processing apparatus can be reduced accordingly so that the apparatus can be installed at low costs. Since products that are stored for many days can be manufactured, the fish meat and/or kneaded fish meat products of the invention can be stored in a chilled state for 2 to 3 months so that they can be easily distributed on the market. Furthermore, according to the low-temperature and high-pressure processing method of the present invention, when the products are stored in a frozen state, high-pressure treatment of raw material fish meat and/or a kneaded fish meat product can be performed at low temperature without dehydration treatment thereof. In the low-temperature and high-pressure processing method of the present invention, the dehydrated fish meat and/or a kneaded fish meat product is sliced to thin pieces, which are then subjected to high-pressure treatment at low temperature while they are maintained in a frozen state, so that a new food having fresh taste and texture can be produced easily.

That is, according to the high-pressure processing method of the present invention, products of which the denaturation of proteins is inhibited more than the conventional method can be obtained and also products having favorable texture and taste having the advantage of taste of raw material can be obtained. In particular, when use is made of salmon, mackerel, herring, horse mackerel, sardine, and pacific saury, many superior features compared to other fish meats can be observed.

What is claimed is:

1. A low-temperature and high-pressure processing method for fish meat and/or a kneaded fish meat product, comprising high-pressure processing, at low temperature and in a pressure range of 1,500 to 2,000 kg/cm$^2$, a frozen fish meat and/or a frozen kneaded fish meat product obtained by dehydrating and freezing fish meat and/or a kneaded fish meat product, while maintaining the frozen state thereof.

2. The low-temperature and high-pressure processing method for fish meat and/or a kneaded fish meat product according to claim 1, wherein the fish meat and/or the kneaded fish meat product is dehydrated until the water content thereof becomes in the range of 50 to 65%.

3. The low-temperature and high-pressure processing method for fish meat and/or a kneaded fish meat product according to claim 2, wherein the frozen fish meat and/or the frozen kneaded fish meat product is sliced to thin pieces, one piece or several pieces together are wrapped under vacuum and frozen again, the frozen fish meat and/or a kneaded fish meat product is high-pressure processed at low temperature while maintaining the frozen state thereof.

4. The low-temperature and high-pressure processing method for fish meat and/or a kneaded fish meat product according to claim 2, wherein the high-pressure processing is performed at a temperature in the range of −1° C. to −24° C.

5. The low-temperature and high-pressure processing method for fish meat and/or a kneaded fish meat product according to claim 2, wherein frozen fish meat and/or a kneaded fish meat product wrapped under vacuum is charged in a high-pressure processing chamber of a low-temperature and high-pressure processing apparatus, an anti-freezing fluid as a pressure elevating medium cooled to a temperature in the range of −1° C. to −24° C. is filled in the high-pressure processing chamber, and a high-pressure of 1,500 to 2,000 kg/cm$^2$ is applied thereto for a predetermined time.

6. The low-temperature and high-pressure processing method for fish meat and/or a kneaded fish meat product according to claim 2, wherein the fish meat and/or kneaded fish meat product comprises fish selected from the group consisting of salmon, mackerel, herring, pacific saury, and sardine.

7. Fish meat and/or a kneaded fish meat product obtained by the low-temperature and high-pressure processing method according to claim 2.

8. The low-temperature and high-pressure processing method for fish meat and/or a kneaded fish meat product according to claim 1, wherein said high-pressure processing, at low temperature, occurs for 5 to 30 minutes.

9. Dehydrated and frozen fish meat and/or a dehydrated and frozen kneaded fish meat product obtained by the low-temperature and high-pressure processing method for fish meat and/or a kneaded fish meat product according to claim 1.

10. The low-temperature and high-pressure processing method for fish meat and/or a kneaded fish meat product according to claim 1, wherein the frozen fish meat and/or the frozen kneaded fish meat product is sliced to thin pieces, one piece or several pieces together are wrapped under vacuum and frozen again, the frozen fish meat and/or a kneaded fish meat product is high-pressure processed at low temperature while maintaining the frozen state thereof.

11. The low-temperature and high-pressure processing method for fish meat and/or a kneaded fish meat product according to claim 10, wherein the high-pressure processing is performed at a temperature in the range of −1° C. to −24° C.

12. The low-temperature and high-pressure processing method for fish meat and/or a kneaded fish meat product according to claim 10, wherein frozen fish meat and/or a kneaded fish meat product wrapped under vacuum is charged in a high-pressure processing chamber of a low-temperature and high-pressure processing apparatus, an anti-freezing fluid as a pressure elevating medium cooled to a temperature in the range of −1° C. to −24° C. is filled in the high-pressure processing chamber, and a high-pressure of 1,500 to 2,000 kg/cm$^2$ is applied thereto for a predetermined time.

13. The low-temperature and high-pressure processing method for fish meat and/or a kneaded fish meat product according to claim 10, wherein the fish meat and/or kneaded fish meat product comprises fish selected from the group consisting of salmon, mackerel, herring, pacific saury, and sardine.

14. Fish meat and/or a kneaded fish meat product obtained by the low-temperature and high-pressure processing method according to claim 10.

15. The low-temperature and high-pressure processing method for fish meat and/or a kneaded fish meat product according to claim 1, wherein the high-pressure processing is performed at a temperature in the range of −1° C. to −24° C.

16. The low-temperature and high-pressure processing method for fish meat and/or a kneaded fish meat product according to claim 15, wherein frozen fish meat and/or a kneaded fish meat product wrapped under vacuum is charged in a high-pressure processing chamber of a low-temperature and high-pressure processing apparatus, an anti-freezing fluid as a pressure elevating medium cooled to a temperature in the range of −1° C. to −24° C. is filled in the high-pressure processing chamber, and a high-pressure of 1,500 to 2,000 kg/cm$^2$ is applied thereto for a predetermined time.

17. The low-temperature and high-pressure processing method for fish meat and/or a kneaded fish meat product according to claim 15, wherein the fish meat and/or kneaded fish meat product comprises fish selected from the group consisting of salmon, mackerel, herring, pacific saury, and sardine.

18. Fish meat and/or a kneaded fish meat product obtained by the low-temperature and high-pressure processing method according to claim 15.

19. The low-temperature and high-pressure processing method for fish meat and/or a kneaded fish meat product according to claim 1, wherein frozen fish meat and/or a kneaded fish meat product wrapped under vacuum is charged in a high-pressure processing chamber of a low-temperature and high-pressure processing apparatus, an anti-freezing fluid as a pressure elevating medium cooled to a temperature in the range of −1° C. to −24° C. is filled in the high-pressure processing chamber, and a high-pressure of 1,500 to 2,000 kg/cm$^2$ is applied thereto for a predetermined time.

20. The low-temperature and high-pressure processing method for fish meat and/or a kneaded fish meat product according to claim 19, wherein the fish meat and/or kneaded fish meat product comprises fish selected from the group consisting of salmon, mackerel, herring, pacific saury, and sardine.

21. Fish meat and/or a kneaded fish meat product obtained by the low-temperature and high-pressure processing method according to claim 19.

22. The low-temperature and high-pressure processing method for fish meat and/or a kneaded fish meat product according to claim 1, wherein the fish meat and/or a kneaded fish meat product of fish is selected from the group consisting of salmon, mackerel, herring, pacific saury, or sardine.

23. Fish meat and/or a kneaded fish meat product obtained by the low-temperature and high-pressure processing method according to claim 22.

24. Fish meat and/or a kneaded fish meat product obtained by the low-temperature and high-pressure processing method according to claim 1.

25. A low-temperature and high-pressure processing method for fish meat, comprising high-pressure processing, a frozen fish meat obtained by freezing fish meat containing 6–13% fat at low temperature and in a pressure range of 1,500 to 2,000 kg/cm$^2$ while maintaining the frozen state thereof.

26. The low-temperature and high-pressure processing method for fish meat and/or a kneaded fish meat product according to claim 25, wherein the frozen fish meat and/or the frozen kneaded fish meat product is sliced to thin pieces, one piece or several pieces together are wrapped under vacuum and frozen again, the frozen fish meat and/or a kneaded fish meat product is high-pressure processed at low temperature while maintaining the frozen state thereof.

27. The low-temperature and high-pressure processing method for fish meat and/or a kneaded fish meat product according to claim 25, wherein the high-pressure processing is performed at a temperature in the range of −1° C. to −24° C.

28. The low-temperature and high-pressure processing method for fish meat and/or a kneaded fish meat product according to claim 25, wherein frozen fish meat and/or a kneaded fish meat product wrapped under vacuum is charged in a high-pressure processing chamber of a low-temperature and high-pressure processing apparatus, an anti-freezing fluid as a pressure elevating medium cooled to a temperature in the range of −1° C. to −24° C. is filled in the high-pressure processing chamber, and a high-pressure of 1,500 to 2,000 kg/cm$^2$ is applied thereto for a predetermined time.

29. The low-temperature and high-pressure processing method for fish meat and/or a kneaded fish meat product according to claim 25, wherein the fish meat and/or kneaded fish meat product comprises fish selected from the group consisting of salmon, mackerel, herring, pacific saury, and sardine.

30. Fish meat and/or a kneaded fish meat product obtained by the low-temperature and high-pressure processing method according to claim 25.

31. A method for processing at least one of fish meat and a kneaded fish meat product, comprising high-pressure processing, at low temperature, at least one of dehydrated, frozen fish meat and a dehydrated, frozen kneaded fish meat product, while maintaining a frozen state thereof.

32. A method for processing at least one of fish meat and a kneaded fish meat product, comprising:

dehydrating at least one of fish meat and a kneaded fish meat product;

freezing the at least one of fish meat and a kneaded fish meat product; and high-pressure processing of the at least one of fish meat and a kneaded fish meat product, while maintaining a frozen state thereof.

* * * * *